July 10, 1945. G. STUHLFAUTH 2,380,269
APPARATUS FOR BONDING ONE ARTICLE TO ANOTHER
Filed Jan. 13, 1944 2 Sheets-Sheet 1

INVENTOR
G. STUHLFAUTH
BY Harry R. Duff
ATTORNEY

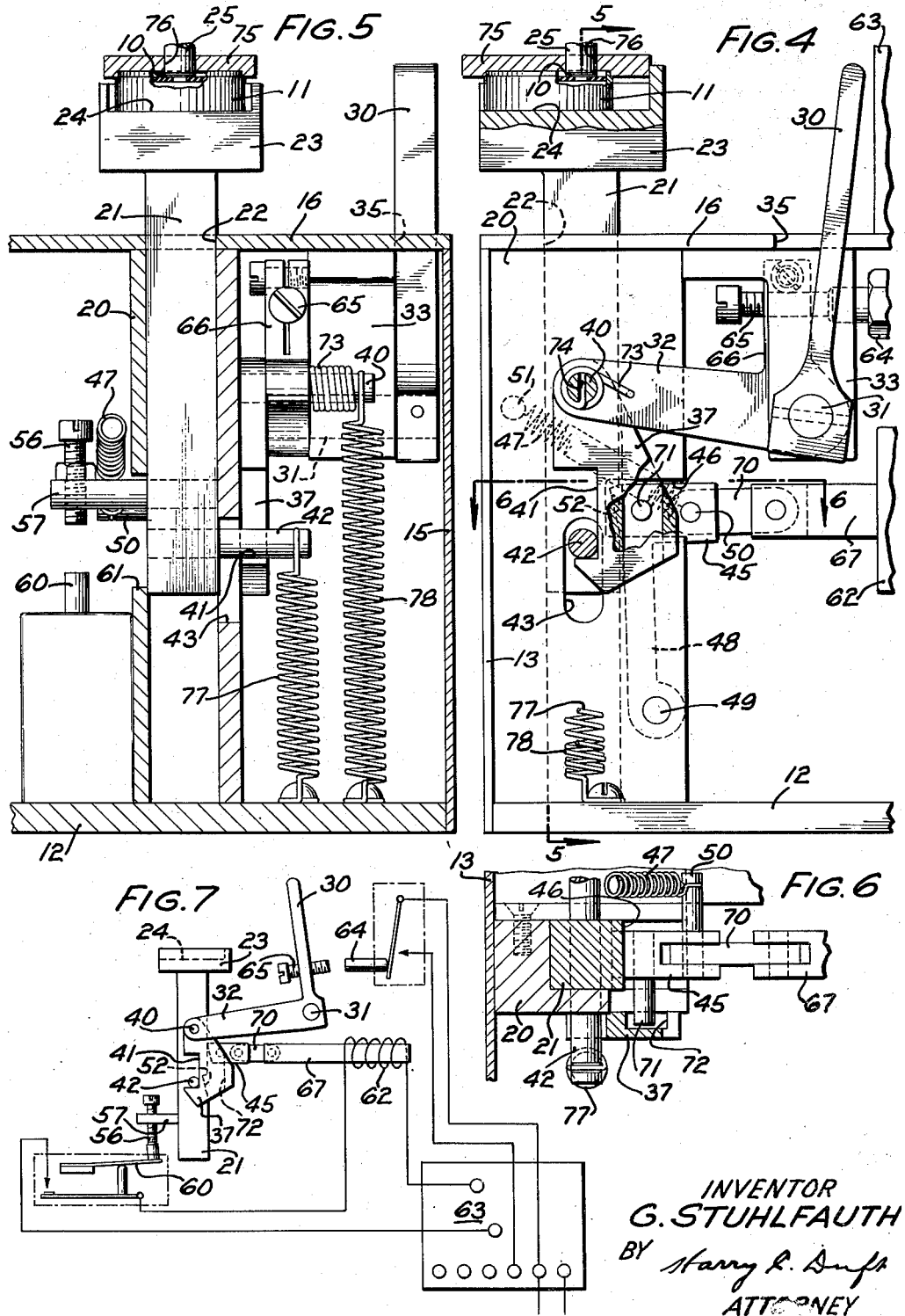

Patented July 10, 1945

2,380,269

UNITED STATES PATENT OFFICE 2,380,269

APPARATUS FOR BONDING ONE ARTICLE TO ANOTHER

George Stuhlfauth, Chicago, Ill., assignor to Western Electric Company, Incorporated, New York, N. Y., a corporation of New York Application January 13, 1944, Serial No. 518,088

16 Claims. (Cl. 154—1)

This invention relates to an apparatus for bonding one article to another, and more particularly to an apparatus for bonding an article coated with a thermo-reactive bonding material to another article.

In the manufacture of some types of articles, it is sometimes the practice to cover all or a portion of the article with a fabric or similar material to form a protective covering. One practice has been to coat a side of the covering material with a thermo-reactive glue or cement prior to assembling the covering on the article and then to bond the covering to the article by the application of suitable heat and pressure. Many of the bonding materials commonly used are critical in their reaction to heat and it has been found, on the one hand, that if heat is not applied for a sufficient time, the bonding material will not become sufficiently plastic and adhesive to form a satisfactory bond, while, on the other hand, if heat is applied for too long a time, some of the bonding material is volatilized or absorbed into the fabric, or both, and the remainder is then insufficient to form a secure bond.

An object of the present invention is to provide an efficient and effective apparatus for bonding an article coated with a thermo-reactive bonding material to another article.

In accordance with one embodiment of this invention, an apparatus is provided for attaching a fabric covering to a portion of an article at a definite temperature and pressure for a predetermined length of time, wherein a platform carrying the article to be covered and having the covering in position thereon is elevated against a heated, movably suspended element of definite weight and held against that element so that the weight of the element is wholly supported by the elevated article. The elevation of the platform sets in operation a timing device for lowering the platform after a predetermined time regardless of whether the elevating mechanism has been released or not.

Other objects and advantages of this invention will be more apparent from the following detailed description taken in conjunction with the drawings, wherein Fig. 1 is a side elevation, partly in section, showing a bonding apparatus constructed in accordance with this invention;

Fig. 4 is a fragmentary elevation similar to Fig. 1, showing, however, the platform in elevated position;

Fig. 5 is a vertical sectional view along the line 5—5 of Fig. 4;

Fig. 6 is a fragmentary horizontal sectional view along the line 6—6 of Fig. 4; and Fig. 7 is a schematic view showing the circuit employed with this apparatus.

Figure 1:
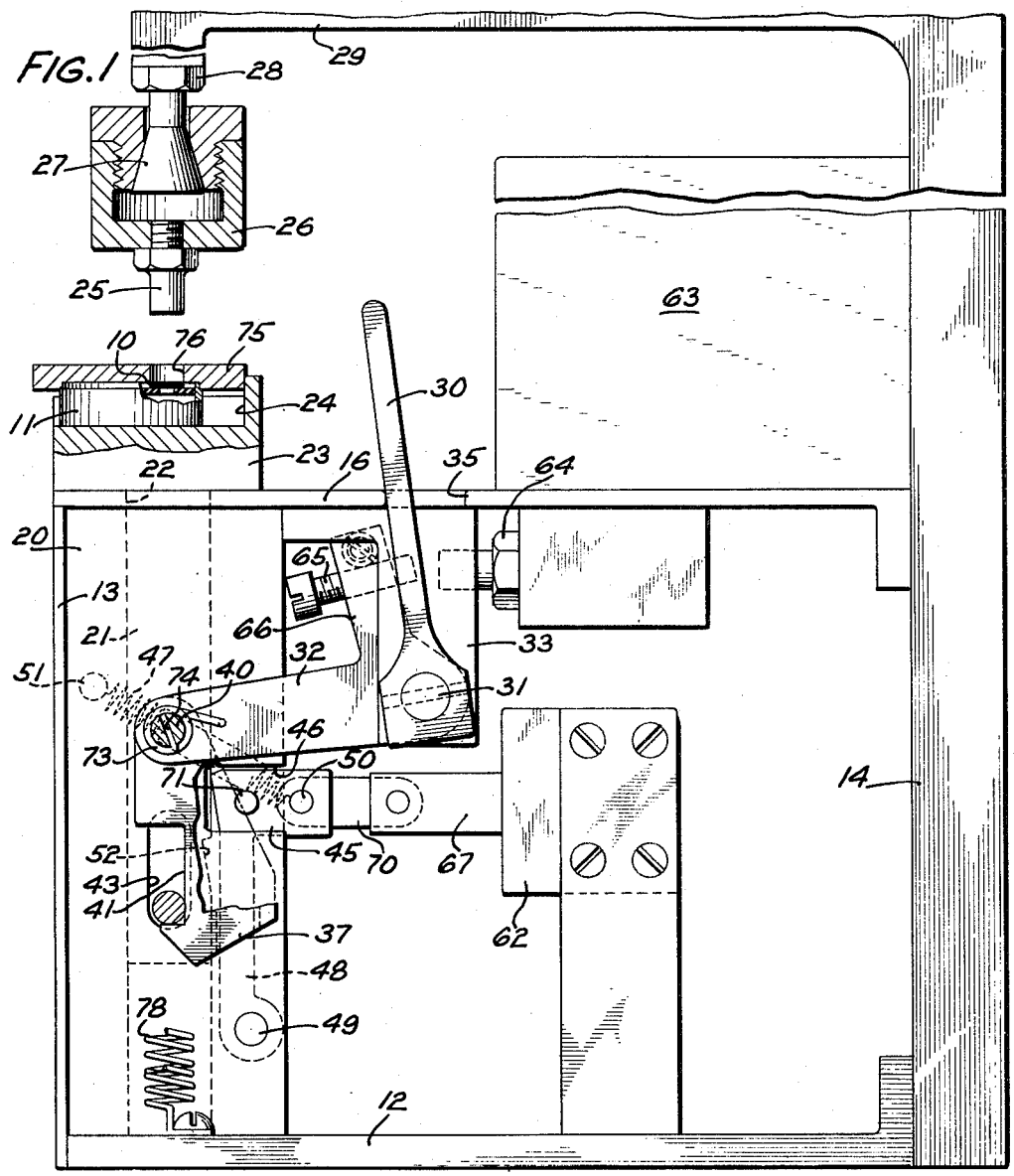
Figure 2:
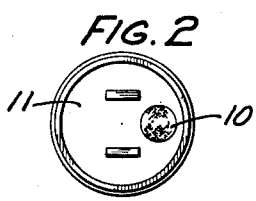
Fig. 2 is a detail plan view of an article having a covering bonded thereto in accordance with this invention.

Referring now to the drawings, and particularly to Fig. 1, wherein an apparatus is illustrated for attaching a disc 10 of silk, having a coating of a thermo-reactive adhesive material on a side thereof, to a receiver assembly 11, shown in detail in Fig. 2, it will be seen that the apparatus itself comprises a housing base 12 having front and rear walls 13 and 14, respectively, mounted thereon and a pair of side walls 15, one of which is shown in Fig. 5. A cross plate 16, mounted between the upper ends of these walls, forms the top of the apparatus housing. An elongated bearing block 20, mounted within the apparatus housing and positioned against the front wall 13, is suitably apertured to receive the lower portion of a vertically movable square plunger 21 which is slidably journalled therein, the top plate 16 of the apparatus housing being provided with an aperture 22 to permit the upper portion of the plunger 21 to extend therethrough.

A rectangular block 23 is fixed to the upper end of the plunger 21 and serves as a platform for supporting the receiver assembly 11 during the bonding operation. As may be seen in Figs. 1, 4 and 5, the block 23 is provided with a recess 24, the sides of which are suitably spaced to engage the receiver assembly 11 and to position it properly with respect to a heated member 25 which is positioned above the block 23. The heated member 25 is threaded into and mounted on the lower side of a cylindrical housing 26, the upper portion of which is apertured to receive a cone-shaped block 27 fixed to the lower end of a stationary heating unit 28. The interior wall of the housing 26 is tapered so as to engage the sides of the cone-shaped block 27 and to retain the block therein. Heat is transferred from the heating element 28 through cone-shaped block 27 to the cylindrical housing 26 and the member 25. The heating unit 28, which is similar to that of a soldering iron, is mounted on the left end of a fixed horizontal arm 29 which is integrally formed at its right end, as viewed in Fig. 1, with the upper end of the rear wall 14 of the apparatus housing. This rear wall is made substantially heavier in construction than the other walls of the housing in order to provide the required support for the arm 29 and parts supported thereby.

Sufficient space is provided within the housing 26 to permit the housing to be moved upwardly relatively to the block 27. When the platform 23 with the receiver assembly 11 positioned thereon is moved upward and into engagement with the heated member 25, the member 25 and its housing 26 are thereby lifted upward relatively to the supporting block 27 and the full weight of the housing 26 and member 25 is then supported on the receiver assembly. The housing 26 and member 25 are selected to have a definite weight so that the disc 10 will be pressed against the receiver assembly 11 with the desired pressure.

Figure 3:
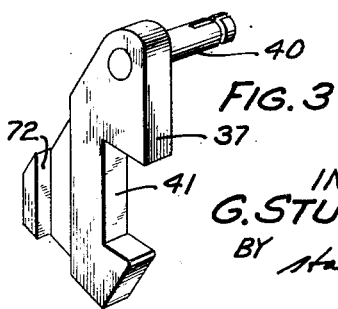
Fig. 3 is a detail perspective view of a block used in connection with this apparatus.

The platform 23 is raised into engagement with the heated member 25 by moving the plunger 21 upward, the plunger being lifted by rotating a bell crank comprising a lever arm 30, a shaft 31 and an arm 32 extending at right angles to the lever arm 30. The shaft 31 is journalled in a downwardly extending block 33 which is mounted on the underside of the plate 16 and, as may be seen in Figs. 1, 4 and 5, the cover plate 16 is slotted at 35 to permit the lever arm 30 to extend therethrough and to be pivotable. Rotating the bell crank causes a pawl block 37 which is pivotally supported at the left end of the arm 32 by a pin 40, extending transversely therethrough, to be moved upward. The pin 40 is keyed to the pawl block 37 and rotatably journalled in the left end of the arm 32. As may be seen in Fig. 3, the pawl block 37 has a recess 41 formed in the forward portion thereof. A pin 42 (Fig. 5) fixed to and extending from a side of the plunger 21 through a slot 43 formed in a side of the block 20 is engaged by the lower side of the recess 41 as the pawl block 37 is moved upward, thus causing the pawl block to elevate the plunger 21 and thereby to lift the platform 23.

In order to retain the platform 23 in elevated position, a latch block 45 is pivotally positioned in a horizontal aperture 46 formed in a side of the bearing block 20 and is movable with respect to the block 20 so that its forward portion may be pressed against a side of the plunger 21 by a spring 47. The latch block 45 is mounted on the upper end of an arm 48, the lower end of which is pivotally supported on a shaft 49 journalled in the bearing block 20. One end of the spring 47 is attached to a pin 50 mounted on the left side of the block 45, as viewed in Fig. 5, while the other end of the spring 47 is attached to a pin 51, mounted on the left side of the bearing block 20, as shown in Figs. 1 and 4. Referring to Fig. 1, it will be seen that a notch 52 is formed in the lower portion of the plunger 21 on the side engaged by the latch block 45. Thus, when the plunger 21 is raised to the position shown in Fig. 4, the latch block 45, being urged forward by the spring 47, will enter the notch 52 and thereby prevent the plunger from moving downward should the lever arm 30 be moved back to starting position.

As the plunger is moved upward, a vertically disposed adjustable member 56, threaded into the left end of a bracket arm 57, which extends to the left, as viewed in Fig. 5, of the plunger and is mounted at right angles thereto, is moved upward permitting a normally closed switch 60 to close. A suitable slot 61 is formed in the left side of the bearing block 20 to permit the arm 57 to move with the plunger 21. Closing the switch 60 prepares a circuit to a solenoid 62, which circuit is finally completed through a timing mechanism 63, the operation of which is initiated by the closing of a micro-switch 64. Referring to Figs. 1 and 4, it will be seen that moving the lever arm 30 in a clockwise direction to cause the receiver assembly on the platform 23 to be moved into engagement with the heated member 25, also causes a threaded member 65, which extends transversely through an arm 66, integrally formed at right angles to the arm 32, to actuate the micro-switch 64. Closing the micro-switch 64 sets in operation the timing mechanism 63 whereby, at the end of a predetermined period, the circuit is completed to the solenoid 62 to cause a solenoid shaft 67 to be moved to the right, as viewed in Figs. 1, 4 and 7, and thus to withdraw the latch 45, which is pivotally connected to the solenoid shaft 67 by a link arm 70. Withdrawing the latch 45 permits the shaft 21 to move downward.

Should, however, the lever arm 30 not have been released and returned to starting position, a pin 71 is mounted in a side of the latch block 45 and extends at right angles thereto into a vertically slotted recess 72 formed in an adjacent side of the pawl block 37 so that, as the latch 45 is withdrawn by the solenoid, the pawl block 37 will be pivoted in a counterclockwise direction thereby disengaging the lower wall of the recess 41 from the pin 42 associated with the plunger 21 and permitting the plunger to drop regardless of whether the lever arm 30 has been returned to starting position or not. When, however, at the close of a cycle of operation, the solenoid 62 is deenergized, the pawl block 37 is returned into position to engage the pin 42 by a helical spring 73 which is wound about the shaft 40. As shown in Figs. 1, 4 and 5, one end of the spring is fixed on the arm 32 while the other end of the spring is inserted in a transverse slot 74 formed in the outer end of the shaft 40. The spring is wound so as to apply a force to the shaft 40 tending to rotate the pawl block 37 in a clockwise direction, that is, tending to move the pawl block into position to engage the pin 42. The solenoid 62 is selected, of course, to have sufficient force to pivot the pawl block 37 against the torque of the spring 73.

In the operation of this bonding apparatus, the silk disc 10 is positioned on the receiver assembly 11, as shown in Fig. 2 and the receiver assembly is transferred to the recess 24 formed in the upper surface of the platform block 23, as shown in Fig. 1. A retaining plate 75, suitably configured to be received in the upper portion of the recess 24 is then assembled over the receiver assembly 11 to hold the silk disc 10 in place during the bonding operation. The retaining plate 75 has an aperture 76 formed therein through which the heated member 25 may extend so as to bear on the silk disc 10.

After the receiver assembly and retaining plate have been positioned on the platform 23, the lever arm 30 of the bell crank is moved in a clockwise direction, as viewed in Fig. 1, to elevate the platform 23 and, thus, to bring the receiver assembly and silk disc into engagement with the lower end of the heated member 25. At the same time, the normally closed switch 60 is permitted to close, the threaded member 56 moving upward with the plunger 21. This, as aforesaid, prepares a circuit from the timing mechanism 63 to the solenoid 62. The threaded member 65, associated with the bell crank is adjusted so that, as the receiver assembly is brought into contact with the heated member 25, the micro-switch 64 which controls the operation of the timing mechanism 63 is closed to energize the timing mechanism. The latch 45 has, of course, been moved by the spring 47 into the notch 52 formed in the side of the plunger to retain the plunger in elevated position.

After a predetermined time, regardless of the position of the lever arm 30, the timing mechanism 63 causes the solenoid 62 to be energized and to withdraw the latch block 45 from the notch 52, at the same time pivoting the pawl block 37 in a counter-clockwise direction and disengaging it from the pin 42 of the plunger 21. Thus, even through the lever arm 30 were held in pivoted position such as would normally cause the plunger to be held in elevated position, the plunger will be returned to starting position.

In order to insure that the plunger and platform 23 will move downwardly when the latch 45 is withdrawn, a helical spring 77 is provided having its upper end connected to the outer end of the pin 42 which is mounted on the plunger 21 and its lower end fixed to the base 12 of the apparatus. The spring 77 thus exerts a constant force tending to pull the plunger downwardly and, when the latch 45 is withdrawn, returns the plunger to its lower position immediately. In order to return the bell crank to starting position when the lever arm 30 is released, a second helical spring 78 is provided having its upper end connected to the outer end of the shaft 40 which is journalled in the arm 32 of the bell crank and its lower end attached to the base 12 of this apparatus. This spring exerts a constant force tending to pull the bell crank in a counter-clockwise direction.

While this invention has been described in connection with the bonding of a silk disc to a receiver assembly, it will be understood that the range of application of this apparatus is much broader than this one embodiment and that many changes and modifications may be made therein without departing from the spirit or scope of this invention.

What is claimed is:

1. An article bonding apparatus comprising a movable platform for supporting an article assembly, means engageable by an article on said platform for applying heat to said article, means for supporting said heating means in position to be lifted by an article on said platform, means for engaging and moving said platform to engage an article with said heating means and lifting the heating means from its supporting means to apply a pressure to the article equal to the weight of the heating means, means for retaining said platform in the position in which the article is in engagement with and supporting the heating means, and means for disengaging said retaining means from the platform after a predetermined time to disengage the article from the heating means and return the heating means to its supporting means.

2. An article bonding apparatus comprising a movable platform for supporting an article assembly, means engageable by an article on said platform for applying heat to said article, retractable means for engaging and moving said platform to engage an article with said heating means, means for retaining said platform in the position in which the article is in engagement with the heating means, means for disengaging said retaining means from retaining engagement with the platform after a predetermined time, and means for retracting said platform moving means from engagement with the platform after a predetermined time.

3. An article bonding apparatus comprising a movable platform for supporting an article assembly, a heating element positioned to be engaged and lifted by an article on said platform to heat the article and apply a pressure to it equal to the weight of the heating element, means engageable with said platform for elevating said platform to engage an article with said heating means, means for retaining said platform in elevated position, means for disengaging said retaining means from the platform after a predetermined time, and means for disengaging said platform elevating means from the platform after a predetermined time.

4. An article bonding apparatus comprising a platform for supporting an article assembly, heating means engageable by an article on said platform, retractable means for engaging and elevating the platform to engage an article on the platform with the heating means, spring actuated means engageable with the platform for retaining said platform in elevated position, electromagnetically actuated means for disengaging said retaining means from the platform after a predetermined time, and means operated by said electromagnetically actuated means for retracting said platform elevating means out of engagement with the platform.

5. In an article bonding apparatus, a support for an article, a heating element positioned adjacent said article support to be engaged and lifted by the article, means engageable with said article support for moving said article support to engage an article with said heating element for applying the weight of the heating element to the article, means engageable with said support for retaining said article support in the position in which the article is engaged with said heating means, means for disengaging said retaining means from said support after a predetermined time, and means associated with said disengaging means for disengaging said article support moving means from the article support.

6. In an apparatus for attaching a covering to an article, a platform for supporting an article, a pin associated with said platform, a pawl block for engaging said pin, a bell crank associated with said pawl block and operable for causing said pawl block to engage the pin and to elevate the platform, said platform having a notch formed in a portion thereof, a latch block engageable with said notch for retaining said platform in elevated position, a spring associated with said latch block for urging said latch block into engagement with said notch, electromagnetically actuated means for withdrawing said latch block after a predetermined time, and means actuated by said electromagnetically actuated means for disengaging said pawl block from said platform pin to permit said platform to move in a reverse direction regardless of the position of said bell crank.

7. In an apparatus for attaching a covering to an article, a platform for supporting an article, a pin associated with said platform, a pawl block for engaging said pin, a bell crank associated with said pawl block and operable for causing said pawl block to engage the pin and to elevate the platform, said platform having a notch formed in a portion thereof, a latch block engageable with said notch for retaining said platform in elevated position, a spring associated with said latch block for urging said latch block into engagement with said notch, electromagnetically actuated means for withdrawing said latch block after a predetermined time, and means actuated by said electromagnetically actuated means for disengaging said pawl block from said platform pin to permit said platform to move downward regardless of the position of said bell crank, and resilient means for moving said platform downward.

8. In an apparatus for attaching a covering to an article, a platform for supporting an article, a pin associated with said platform, a pawl block for engaging said pin, a bell crank associated with said pawl block and operable for causing said pawl block to engage the pin and to elevate the platform, said platform having a notch formed in a portion thereof, a latch block engageable with said notch for retaining said platform in elevated position, a spring associated with said latch block for urging said latch block into engagement with said notch, a solenoid for withdrawing said latch block from said notch, means operated by the elevation of said platform for preparing a circuit to said solenoid, and means actuated by said platform elevating means for completing the circuit to said solenoid to energize said solenoid after a predetermined time.

9. In an apparatus for attaching a covering to an article, a platform for supporting an article, a pin associated with said platform, a pawl block for engaging said pin, a bell crank associated with said pawl block and operable for causing said pawl block to engage the pin and elevate the platform, said platform having a notch formed in a portion thereof, a latch block engageable with said notch for retaining said platform in elevated position, a spring associated with said latch block for urging said latch block into engagement with said notch, a solenoid for withdrawing said latch block from said notch, and means actuated by said solenoid for disengaging said pawl block from said platform pin to permit said platform to move in a reverse direction regardless of the position of said bell crank.

10. In an article bonding apparatus, a support for an article, a movable heating element adjacent said article support, means for supporting said heating element in position to be lifted by an article, means for moving said article support to engage said article with said heating element to cause said heating element to be lifted from its support and supported by said article, means for retaining said article support in the position in which the article is engaged with said heating means, and means for disengaging said retaining means from the article support after a predetermined time.

11. In an apparatus for attaching a covering to an article, a platform for supporting an article, a movable heating element adjacent said platform, a pin associated with said platform, a pawl block for engaging said pin, means including a bell crank lever for causing said pawl block to engage said pin and to elevate the platform to cause the article to engage the heating element and to support the heating element, said platform having a notch formed in a portion thereof, a latch block engageable with said notch for retaining said platform in elevated position, a spring associated with said latch block for urging said latch block into engagement with said notch, electromagnetically actuated means for withdrawing said latch block after a predetermined time, and means actuated by said electromagnetically actuated means for disengaging said pawl block from said platform pin to permit said platform to move in a reverse direction regardless of the position of said bell crank.

12. In an apparatus for attaching a covering to an article, a platform for supporting an article, a movable heating element adjacent said platform, a pin associated with said platform, a pawl block for engaging said pin, means including a bell crank lever for causing said pawl block to engage said pin and to elevate the platform to cause the article to engage the heating element and to support the heating element, said platform having a notch formed in a portion thereof, a latch block engageable with said notch for retaining said platform in elevated position, a spring associated with said latch block for urging said latch block into engagement with said notch, electromagnetically actuated means for withdrawing said latch block after a predetermined time, means actuated by said electromagnetically actuated means for disengaging said pawl block from said platform to permit said platform to move in a reverse direction regardless of the position of said bell crank, and resilient means for moving said platform in a reverse direction.

13. In an article bonding apparatus, a platform for supporting an article, a pin associated with said platform, a pawl block for engaging said pin, means for causing said pawl block to engage the pin and to elevate the platform, said platform having a notch formed in a portion thereof, a latch block engageable with said notch for retaining said platform in elevated position, a spring associated with said latch block for urging said latch block into engagement with said notch, a solenoid for withdrawing said latch block, means operated by the elevation of said platform for preparing a circuit to said solenoid, and means actuated by said platform elevating means for completing the circuit to said solenoid to energize said solenoid after a predetermined time.

14. In an article bonding apparatus, a platform for supporting an article, a movable heating element adjacent said platform, a pin associated with said platform, a pawl block for engaging said pin, means associated with said pawl block for causing said pawl block to engage the pin and to elevate the platform to cause the article to engage and support the heating element, said platform having a notch formed in a portion thereof, a latch block engageable with said notch for retaining said platform in elevated position, a spring associated with said latch block for urging said latch block into engagement with said notch, a solenoid for withdrawing said latch block, means operated by the elevation of said platform for preparing a circuit to said solenoid, and means actuated by said platform elevating means for completing the circuit to said solenoid to energize said solenoid after a predetermined time.

15. In an article bonding apparatus, a platform for supporting an article, a movable heating element adjacent said platform, a pin associated with said platform, a pawl block for engaging said pin, means including a bell crank lever associated with said pawl block for causing said pawl block to engage the pin and to elevate the platform to cause the article to engage and support the heating element, said platform having a notch formed in a portion thereof, a latch block engageable with said notch for retaining said platform in elevated position, a spring associated with said latch block for urging said latch block into engagement with said notch, a solenoid for withdrawing the latch block from said notch, and means actuated by said solenoid for disengaging said pawl block from said platform pin to permit said platform to move in a reverse direction regardless of the position of said bell crank.

16. In an article bonding apparatus, a support for an article, a movable heating element adjacent said article support, means for suspending said element in position to be lifted and supported by an article on the article support, means for moving said article support to engage said article with said heating element to cause said heating element to be supported by said article, means engageable with the article support for retaining said article support in the position in which the article is engaged with said heating means, means for disengaging said retaining means from said article support after a predetermined time, and means associated with said disengaging means for disengaging said article support moving means from said article support.

GEORGE STUHLFAUTH.